United States Patent [19]

Hammerslag

[11] 4,174,631
[45] Nov. 20, 1979

[54] CLINICAL THERMOMETER WITH THERMO-COUPLE PROBE

[75] Inventor: Julius G. Hammerslag, Newport Beach, Calif.

[73] Assignee: Temp-Stik Corporation, Laguna Hills, Calif.

[21] Appl. No.: 867,975

[22] Filed: Jan. 9, 1978

[51] Int. Cl.² ............................................. G01K 7/02
[52] U.S. Cl. ................................................. 73/359 R
[58] Field of Search ............. 73/359 R, 361; 136/230, 136/232

[56] References Cited

U.S. PATENT DOCUMENTS 3,531,992 10/1970 Moore ............................... 73/359 R
4,062,104 12/1977 Carlsen ............................. 73/359 R Primary Examiner—Donald O. Woodiel
Attorney, Agent, or Firm—Newton H. Lee, Jr.

[57] ABSTRACT

A clinical thermometer device includes a body with means for reading out temperature electrically or electronically and a probe body supporting a pair of thermo-couple wires which are thin and of themselves not self-supporting, with the thermo-couple junction exposed at an end of the probe body. The probe is oriented with respect to a plug receptacle to establish correct polarity, or wires on the probe and contacts in the plug establish correct polarity regardless of orientation.

23 Claims, 11 Drawing Figures

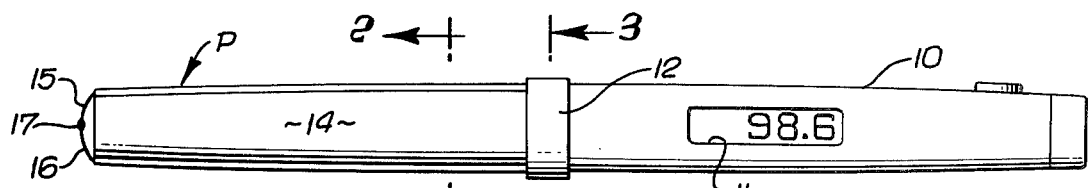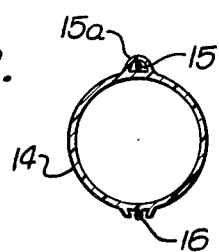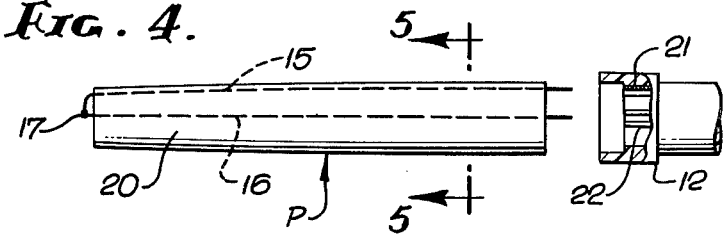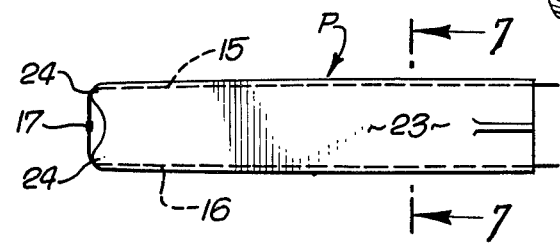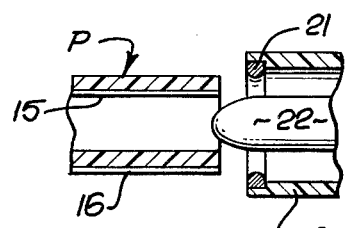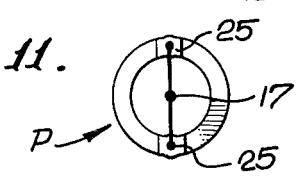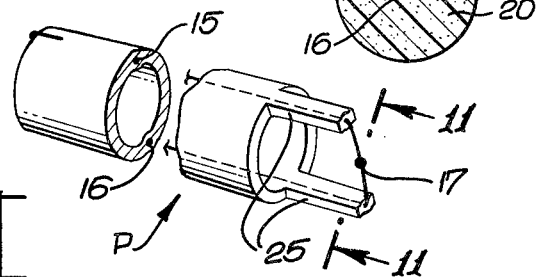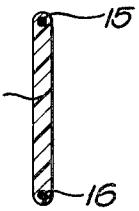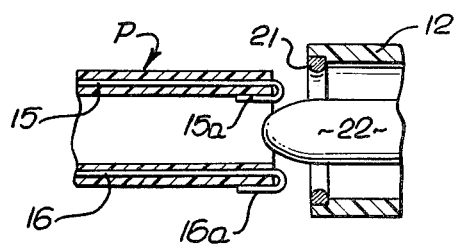

CLINICAL THERMOMETER WITH THERMO-COUPLE PROBE

BACKGROUND OF THE INVENTION

Electrical or electronic clinical fever thermometers for use in sensing and indicating the temperature of a patient are well known. Such thermometers are calculated to be relatively inexpensive in use, as compared with the use of the usual glass thermometers which are fragile, time consuming and often inaccurate.

Known fever thermometers of the electrical or electronic type experience problems in connection with their accuracy or the time necessary to indicate the temperature being sensed, due to the insulating characteristics of the probes, their long thermal time constant and the cooling effect of the mass of the probe on the tissue of the patient.

THE PRIOR ART

Examples of the prior art are U.S. Pat. No. 3,949,609, granted to me Apr. 13, 1976, for "Resistance Thermometer With Disposable Probe"; U.S. Pat. No. 3,688,580, granted to Jarzembski Sept. 5, 1972, for "Clinical Thermometer"; U.S. Pat. No. 3,903,743, granted to Noller Sept. 9, 1973, for "Temperature Compensated Thermometer Utilizing Thermocouples"; and U.S. Pat. No. 3,507,153, granted to Jones, et al., Apr. 21, 1970, for "Tympanic Membrane Thermometer".

The present invention involves the provision of a probe for thermometers of the electrical or electronic type, wherein the thermo-couple wires are very thin and flexible so that they are not self-supporting, but so that the sensor or probe thermo-couple has a very short thermal time constant.

The thermo-couple wires, at their junction, are essentially exposed for direct contact with the tissue of a patient whose temperature is to be taken, without significant intervening insulation or other structure.

Further, the cooling effect of the probe on the tissue of the patient is minimized by the probe structure.

The probe and thermometer readout device may take various forms. The readout may be embodied in a table or wall mounted unit, with a long lead to which the probe is connectible. Alternatively, the readout device may be in the form of a small hand held, self-contained unit, say the size of a fountain pen, with a digital readout, to which the probe is connectible.

The body of the probe may take various forms which are very inexpensive and disposable. For example, various extruded or molded plastic configurations may be utilized wherein the thermo-couple wires are united with the body during its formation. The disposable probes have the same emf characteristics at clinical temperature by reason of being made with wires which are matched.

In addition, the probe and the display device are structured to provide for simplicity of connection and disconnection, with correct polarity.

This invention possesses many other advantages, and has other objects which may be made more clearly apparent from a consideration of several forms in which it may be embodied. Such forms are shown in the drawings accompanying and forming a part of the present specification. These forms will now be described in detail for the purpose of illustrating the general principles of the invention; but it is to be understood that such detailed description is not to be taken in a limiting sense.

BRIEF DESCRIPTION OF THE DRAWINGS

FIG. 1 is an elevation of a clinical thermometer with a thermo-couple probe in accordance with the invention;

FIG. 2 is a transverse section on the line 2—2 of FIG. 1;

FIG. 3 is a transverse section on the line 3—3 of FIG. 1;

FIG. 4 is an elevation of another form of probe and connecting socket therefor;

FIG. 5 is a transverse section on the line 5—5 of FIG. 4;

FIG. 6 is an elevation of still another form of probe;

FIG. 7 is a transverse section on the line 7—7 of FIG. 6;

FIG. 8 is a fragmentary composite view showing another connector for the probe;

FIG. 9 is a fragmentary composite view showing still another connector for the probe.

FIG. 10 is a perspective showing another probe end; and

FIG. 11 is an end elevation of the probe of FIG. 10.

DESCRIPTION OF THE PREFERRED EMBODIMENTS

Referring to the drawings, FIG. 1 shows a thermometer assembly embodying the invention, including a body or case 10, of elongated, cylindrical form, say of the size of a fountain pen, to be easily handled and stored. In the case is a window through which is visible display means providing a readout of temperature, shown as a digital readout which can be accomplished with various electronic means, as is well known and needs no specific illustration herein, whereby the light emitting diodes or crystals are caused to effect the display.

A probe P, in accordance with the invention, is adapted to be removably connected to the body or case 10 by a connector 12 so that the sensed temperature is communicated to the electronic readout means for effecting the display.

The present invention contemplates that if a fast reading clinical thermometer is to be provided which is effective to save the time employed in the use of typical glass thermometers, the sensor or probe must have certain significant characteristics.

The temperature sensor should have a short thermal time constant; there should be little or no thermal insulation between the sensor and the tissue of the patient; the cooling effect of the probe on the tissue should be minimized. These requirements are realized in the present invention by the construction of the heat sensing probe P.

More particularly, the probe P, as shown, comprises an elongated support body 14 which supports a pair of thin thermo-couple wires 15 and 16 which extend longitudinally of the probe body between the connector 12 and the thermo-couple junction 17. These wires are very thin, say under 0.010" in diameter and are, therefore, not self-supporting and the junction 17, itself, due to the very fine or thin wire size has a very short thermal time constant. One of the wires is preferably chromel and the other preferably constantin.

The heat sensing junction 17 is supported in a forwardly extending position, free of any surrounding structure or insulation, so as to facilitate direct contact of the junction with the tissue of a patient whose temperature is to be sensed. Thus, the short thermal time constant of the junction is not effected by the supporting body.

When the junction 17 contacts the tissue of a patient, the thermal response is almost instantaneous, because of the short thermal time constant and because of the absence of insulation, and the thermo-couple is not affected by the ohmic resistance of the saliva or mucous in a patient's mouth, for example, such as is the case with usual resistance type thermometers using a sensing thermistor.

In FIGS. 1-3, the probe structure can be easily made and connected to the thermometer readout device. In this form, the probe body 14 is an elongated thin-walled tube, and the wires 15 and 16 extend along the tube between the junction 17 and the connector 12. This tube may be formed by extruding a plastic material and enclosing the middle sections of the wires in the wall of the extrusion, as seen in FIG. 2, so as to better support the wires. At the connector end, the tube is formed so as to orient the probe with respect to contacts in the display body plug or a connector cable. Thus, the connector end of the probe body has a non uniform section, provided by a plug lug 15a formed on the tube, and one wire 15 is turned back for reception in a contact receptacle in the connector 12 having a contact 18 of the same material as the wire 15. The other thermo-couple wire 16 can engage a contact 19 in the connector and of the same material as the wire 16. This structure assures proper polarization when the probe is connected into the temperature indicating means and no external heat sensitive thermo-couple junctions can be made.

In use, the tissue is contacted directly by the junction 17, and therefore, the tube would have no signigicant cooling effect on the patients tissue in the location of the junction. However, if the tube actually contacts the tissue, the cooling effect is minimal due to the thin edge of the tube and the space or distance between the edge of the tube and the junction.

Other probe forms may be utilized to support the thin thermo-couple wires in a manner to minimize cooling of the tissue in the region of the junction 17.

As seen in FIGS. 4 and 5, the wires 15 and 16 are supported by an elongated, thin cylinder 20 of a foamed material with non-connected cavities in th foam. As before, the junction 17 is disposed forwardly of the body 20 and is not insulated, so that direct contact can be made with the patients tissue. The wire 15 is disposed along the periphery of the body 20, and the wire 16 extends centrally of the body. The plug end of the wires are adapted to engage respective contact rings 21 and 22 within the connector 12 of material the same as the wires to properly polarize the connection and avoid external thermo-couple junctions.

The non-connected cavities of the foam body 20, prevent the portion of the probe adjacent to the junction 17 from absorbing or blotting up saliva from the tissue, so that the low thermal conductivity of the body of foam is maintained.

In FIGS. 6 and 7, the probe body 23 is in the form of an elongated, thin and flat stick, somewhat like a tongue depressor. At the forward end of the body 23, the junction 17 is freely disposed between a pair of spaced tips 24, for direct contact with the tissue of the patient. The wires 15 and 16 extend along the side edges of the flat body and are shown as molded into the plastic material.

The plug end of the body 23 has a suitable nonuniform shape so that the body will be properly oriented in the connector receptacle (not shown), which, without requiring illustration would have a companion shape and contacts engageable by the exposed wire ends.

Referring to FIGS. 8 and 9, companion connector portions of the probe and a plug are shown wherein, as in the case of the structure of FIG. 4, it is not necessary that the probe be specifically oriented with respect to the plug to establish correct polarity.

In each of these forms of FIGS. 8 and 9, the connectors 12 have contact members of materials corresponding with the materials of the thermo-couple wires 15 and 16, respectively. In FIG. 8, the wires 15 and 16 extend one along the inner and the other along the outer peripheries of the tubular probe body and are coterminous with the body. The wires are suitably supported by the tubular body or may be extracted therein and then bared at the connector ends. The connector has the contact member 21, in the form of an external ring and the contact 22 is in the form of a central post or prong, so that the ring and post have circumferentially continuous contact surfaces engageable by the outer and inner wires, without requiring any specific orientation of the parts upon connection.

The connector receptacle of FIG. 9 corresponds to that of FIG. 8. However, the tubular probe P has the wires, which are extruded in the tubular body wall have their contact end bared and turned inwardly into the inner periphery of the body at 15a and outwardly onto the outer periphery of the body at 16a, for engagement with the corresponding circumferentially continuous surfaces of the contacts 21 and 22, so that no specific orientation of the parts is required upon connection.

The probes described above, and equivalent variations thereof, are simple and inexpensive. Thus, such probes can be disposable. Disposable probes and desirable from the standpoint of prevention of cross infection of patients and elimination of cost of sterilization.

Disposable probes utilizing thermo-couples should have corresponding thermo-couple emf characteristics in the clinical temperature range, say 96° to 106° F. Therefore, in the production of the probes of the invention, utilizing commercially available thermo-couple wires, a matching of wires is utilized. Spools of the wires are matched by their deviation from a standard absolute emf at a selected clinical temperature, say 100° F.

When chromel and constantin are used, all spools of each material are tested to determine the deviation from the standard emf, in microvolts. Thereafter, spools of the two materials whose emf deviations add to zero. Or the zero + or − an acceptable tolerance, are paired to make probes whose emf characteristics at clinical temperatures will be the same, within the tolerance desired.

From the foregoing, it will not be understood that the present invention provides a reliable, inexpensive probe for electronic thermometers which is quick and accurate in use, is disposable and safe and easily connectible to and disconnectible from the thermometer display means.

It is believed that the objectives of minimizing the thermal time constant and minimizing the cooling effect of the probe on the tissue or saliva can be best obtained by utilizing the probe structure of FIGS. 10 and 11. Such structure also lends itself to utilization of the bared ends of the wires, turned inside and outside of the tube for purposes of polarization. The probe of FIGS. 10 and 11 has the wires 15 and 16 embedded in the sides of the tube, as by the application of heat to enable the wires to be pressed into the plastic material. An arcuate segmental portion of the tube material is then cut away, leaving the wires supported in thin-walled prongs or residual segments 25 which project axially from the base of cut-away segments. As seen in FIG. 11, since the tube was originally cylindrical the prongs have an arched or segmental form which provides good resistance to bending. The wires bridge the gap between the prongs and are joined at the junction 17. As a result of this structure the mass of the straw material which can be contracted by tissue of the patient is minimized and the junction 17 is exposed for direct contact with the tissue.

I claim:

1. An electrical clinical thermometer comprising display means for indicating a sensed temperature, a temperature sensing probe, and a releasable connector means for connecting said probe to said display means, said probe including an elongated support body, non-self-supporting thin thermo-couple wires extending along and supported by said body from said connector means and terminating in a thermo-couple junction adjacent to the end of said body, said junction being formed between ends of said wires which are bared and which are suspended in spaced relation to the material of said body to be exposed for direct contact with the tissue of a patient, said junction being in a gap free of contact with any solid material.

2. An electrical clinical thermometer as defined in claim 1, said body being a hollow thin walled cylinder.

3. An electrical clinical thermometer as defined in claim 1, said body being composed of a foam material with non-interconnected cavities.

4. An electrical clinical thermometer as defined in claim 1, said body being spatulate.

5. An electrical clinical thermometer as defined in claim 1, said connector means having contacts of the same material as said wires, and means for orienting said wires and contacts for coengagement of like wires and materials.

6. An electrical clinical thermometer as defined in claim 1; said body being a hollow plastic cylinder having said wires embedded therein said cylinder having spaced prongs containing said wires extending beyond the end of said cylinder, with said wires bridging said prongs to form said junction.

7. An electrical clinical thermometer as defined in claim 6, said prongs being small segments of said cylinder.

8. An electrical clinical thermometer comprising display means for indicating a sensed temperature, a temperature sensing probe, and a releasable connector means for connecting said probe to said display means, said probe including an elongated support body, non-self-supporting thin thermo-couple wires extending along and supported by said body from said connector means and terminating in a thermo-couple junction adjacent to the end of said body and suspended in spaced relation to the material of said body to be exposed for direct contact with the tissue of a patient, said connector means having contacts of the same material as said wires and providing radially spaced circumferentially continuous contact surfaces, said wires being spaced for engagement with said surfaces.

9. An electrical clinical thermometer as defined in claim 8, said wires having free ends projecting from said body in laterally spaced relation.

10. An electrical clinical thermometer as defined in claim 8, said body being tubular and supporting one of said wires at its inner periphery and the other of said wires at its outer periphery, with the free ends of said wires bared.

11. An electrical clinical thermometer as defined in claim 8, said body being tubular and supporting said wires at opposite sides thereof with the free ends of said wires bared and turned back on said body disposing one wire end internally and the other wire end externally of said body.

12. A probe for an electrical clinical thermometer comprising: an elongated support body, non-self-supporting thin thermo-couple wires extending along said body and supported thereby and connectible at one end to the temperature display means, said wires terminating at the other end in a thermo-couple junction adjacent to said other end of said body, said junction being formed between ends of said wires which are bared and which are suspended in spaced relation to the material of said body to be exposed for direct contact with the tissue of the patient, said junction being in a gap free of contact with any solid material.

13. A probe as defined in claim 12, wherein said body is a thin walled hollow tube of plastic material containing said wires.

14. A probe as defined in claim 12, wherein said body is a foamed material containing said wires.

15. A probe as defined in claim 12, wherein said body is a foamed material containing said wires, said foamed material having non-connecting cavities.

16. A probe as defined in claim 12, wherein said body is spatulate, said wires extending along said edges of said body, said body having spaced portions at said other end, said junction being between said spaced portions.

17. A probe as defined in claim 12, wherein said body is spatulate, said wires extending along side edges of said body, said body having spaced portions at said other end, said junction being between said spaced portions, said body being of plastic and containing said wires in said side edges.

18. A probe as defined in claim 12, said one end of said body having means for orienting said body and wires in relation to a connector for a display device.

19. A probe as defined in claim 12, said body being a hollow tube containing said wires on opposite sides thereof with said wires bared at said one end, one wire at the outer periphery and the other wire at the inner periphery of said body.

20. A probe as defined in claim 19, said bared wires being coterminous with said one end of said body.

21. A probe as defined in claim 19, said bared wires being turned back internally and externally at said one end of said body.

22. A probe as defined in claim 12; said body being a hollow plastic cylinder having said wires embedded therein said cylinder having spaced prongs containing said wires extending beyond the end of said cylinder, with said wires bridging said prongs to form said junction.

23. A probe as defined in claim 22; said prongs being small segments of said cylinder.

* * * * *